US011301921B2

(12) United States Patent
Yoo

(10) Patent No.: US 11,301,921 B2
(45) Date of Patent: Apr. 12, 2022

(54) SYSTEM FOR PAYMENT BASED ON STORE'S INTRANET, MOBILE TERMINAL INCLUDING PAYMENT FUNCTION BASED ON STORE'S INTRANET, METHOD FOR PROVIDING PAYMENT SERVICE BASED ON STORE'S INTRANET, AND PROGRAM FOR PERFORMING THE SAME

(71) Applicant: SSenStone Inc., Seoul (KR)

(72) Inventor: Chang Hun Yoo, Seoul (KR)

(73) Assignee: SSenStone Inc., Seoul (KR)

( * ) Notice: Subject to any disclaimer, the term of this patent is extended or adjusted under 35 U.S.C. 154(b) by 217 days.

(21) Appl. No.: 16/056,812

(22) Filed: Aug. 7, 2018

(65) Prior Publication Data
US 2019/0050933 A1 Feb. 14, 2019

(30) Foreign Application Priority Data

Aug. 9, 2017 (KR) .................. 10-2017-0100953
Jun. 5, 2018 (KR) .................. 10-2018-0064710

(51) Int. Cl.
G06Q 30/06 (2012.01)
G06Q 20/36 (2012.01)
(Continued)

(52) U.S. Cl.
CPC ......... *G06Q 30/0635* (2013.01); *G06Q 20/32* (2013.01); *G06Q 20/322* (2013.01); *G06Q 20/3674* (2013.01); *G06Q 20/385* (2013.01)

(58) Field of Classification Search
CPC .......... G06Q 30/0635; G06Q 20/3674; G06Q 20/322; G06Q 20/32; G06Q 20/385;
(Continued)

(56) References Cited

U.S. PATENT DOCUMENTS 4,720,860 A   1/1988  Weiss
8,600,892 B2 * 12/2013  Foster ............... G06Q 20/3276
                                                        705/44
(Continued)

FOREIGN PATENT DOCUMENTS

CN     105590214 A    5/2016
JP     2001-067396 A  3/2001
(Continued)

OTHER PUBLICATIONS

WLAN (Wireless Local Area Network) Definition, updated May 22, 2020). (Year: 2020).*
(Continued)

*Primary Examiner* — Patrick McAtee
*Assistant Examiner* — Vincent I Idiake
(74) *Attorney, Agent, or Firm* — Studebaker & Brackett PC

(57) ABSTRACT

A system for payment based on a store's intranet, a mobile terminal including a payment function based on a store's intranet, a method for providing a payment service based on a store's intranet, and a program for performing the same are provided. The method includes providing, by a store client, a payment page in a store depending on a request of a user client, receiving, by the store client, a virtual code and order information which are input to the payment page, and transmitting, by the store client, the virtual code and the order information to a payment service server over the Internet.

8 Claims, 6 Drawing Sheets

(51) Int. Cl.
*G06Q 20/32* (2012.01)
*G06Q 20/38* (2012.01)

(58) Field of Classification Search
CPC ............ G06Q 20/202; G06Q 20/3223; G06Q 20/325; G06Q 20/3276; G06Q 20/3278; G06Q 20/351; G06Q 20/401
See application file for complete search history.

(56) References Cited

U.S. PATENT DOCUMENTS

| | | | | |
|---|---|---|---|---|
| 9,864,994 | B2* | 1/2018 | Huang | G06Q 20/3823 |
| 2003/0105964 | A1 | 6/2003 | Brainard et al. | |
| 2005/0027543 | A1* | 2/2005 | Labrou | G06Q 20/12 705/26.35 |
| 2009/0048971 | A1 | 2/2009 | Hathaway et al. | |
| 2013/0211967 | A1* | 8/2013 | Ogilvy | G06Q 20/36 705/26.82 |
| 2014/0032415 | A1 | 1/2014 | Lee et al. | |
| 2014/0136355 | A1 | 5/2014 | Park et al. | |
| 2014/0249945 | A1 | 9/2014 | Gauthier et al. | |
| 2014/0279563 | A1 | 9/2014 | Dierickx et al. | |
| 2015/0134540 | A1 | 5/2015 | Law et al. | |
| 2016/0180325 | A1* | 6/2016 | Davis | G06Q 20/085 705/44 |
| 2017/0178138 | A1* | 6/2017 | Forrest | G06Q 20/425 |
| 2018/0130053 | A1* | 5/2018 | Matthews | H04W 12/06 |
| 2018/0351929 | A1* | 12/2018 | Kohli | G06Q 20/363 |

FOREIGN PATENT DOCUMENTS

| | | |
|---|---|---|
| JP | 2004-102484 A | 4/2004 |
| JP | 2009-205234 A | 9/2009 |
| KR | 10-2001-0088928 A | 9/2001 |
| KR | 10-2016-0036471 A | 4/2016 |
| KR | 10-1675927 B1 | 11/2016 |
| KR | 10-2017-0005580 A | 1/2017 |
| KR | 10-2017-0040469 A | 4/2017 |
| WO | 2010/071904 A2 | 6/2010 |
| WO | 2010/071904 A3 | 6/2010 |
| WO | 2010/071904 A9 | 6/2010 |
| WO | 2014/011691 A1 | 1/2014 |

OTHER PUBLICATIONS

The extended European search report issued by the European Patent Office dated Oct. 29, 2018, which corresponds to European Patent Application No. 18187762.2-1217 and is related to U.S. Appl. No. 16/056,812.
A Search Report issued by the Intellectual Property Office of Singapore dated Sep. 2, 2019, which corresponds to Singapore Patent Application No. 10201806705S and is related to U.S. Appl. No. 16/056,812.
International Search Report issued in PCT/KR2018/007852; dated Oct. 18, 2018.
A Written Opinion issued by the Intellectual Property Office of Singapore dated Jul. 27, 2020, which corresponds to Singapore Patent Application No. 10201806705S and is related to U.S. Appl. No. 16/056,812.
Communication pursuant to Article 94(3) EPC issued by the European Patent Office dated May 6, 2020, which corresponds to European Patent Application No. 18187762.2-1213 and is related to U.S. Appl. No. 16/056,812.
Summons to attend oral proceedings pursuant to Rule 115(1) EPC issued by the European Patent Office dated Sep. 21, 2020, which corresponds to European Patent Application No. 18187762.2-1213 and is related to U.S. Appl. No. 16/056,812.
An Office Action; "Notice of Reasons for Refusal," mailed by the Japanese Patent Office dated Nov. 24, 2020, which corresponds to Japanese Patent Application No. 2019-161960 and is related to U.S. Appl. No. 16/056,812 with English language translation.

* cited by examiner

200

SYSTEM FOR PAYMENT BASED ON STORE'S INTRANET, MOBILE TERMINAL INCLUDING PAYMENT FUNCTION BASED ON STORE'S INTRANET, METHOD FOR PROVIDING PAYMENT SERVICE BASED ON STORE'S INTRANET, AND PROGRAM FOR PERFORMING THE SAME

CROSS-REFERENCE TO RELATED APPLICATIONS

A claim for priority under 35 U.S.C. § 119 is made to Korean Patent Application Nos. 10-2017-0100953 filed on Aug. 9, 2017 and 10-2018-0064710 filed on Jun. 5, 2018, in the Korean Intellectual Property Office, the entire contents of which are hereby incorporated by reference.

BACKGROUND

Embodiments of the inventive concept described herein relate to a system for payment based on a store's intranet, a mobile terminal including a payment function based on the store's intranet, a method for providing a payment service based on the store's intranet, and a program for performing the same.

Code-type data may be used in many areas. An Internet personal identification number (IPIN), a resident registration number, or the like for identifying a user as well as a card number used upon payment and an account number may be code-type data.

However, there may be many accidents where such code data is hacked in a process of using the code data. In case of a card number, since the real card number is written on a card surface without change, the card number may be visually exposed to others. A card number may be hacked while it is transmitted to a POS device without change upon payment using a magnetic portion.

There have been many attempts to use a virtual code such that a real code is not exposed without change. However, there is a need for data for identifying a user to search for a real card number corresponding to a virtual token. For example, in case of a one time password (OTP), a code is changed and generated per time, but a log-in procedure is needed to determine an algorithm assigned to a user.

Furthermore, since an existing virtual token is provided and used through communication with a virtual token service server, it is unable to use the virtual token in a situation where communication is unavailable. Further, a virtual token service is unavailable in a state where it is connected to a wireless-fidelity (Wi-Fi) network to enhance security. Thus, payment may proceed using a virtual token in only a situation where wireless communication (e.g., third generation (3G), long term evolution (LTE)) is available.

SUMMARY

Embodiments of the inventive concept provide a system for payment based on a store's intranet to place an order using a user client of a user over an intranet.

Furthermore, embodiments of the inventive concept provide a mobile terminal including a payment function based on a store's intranet to connect to an intranet using a user client for an order and payment and generate a virtual code for placing an order, in a state where the mobile terminal is blocked from the Internet.

Furthermore, embodiments of the inventive concept provide a method for providing a payment service based on a store's intranet to perform payment using each user client without using a payment terminal without exposing a real card number by performing an order and payment over an intranet using a store client and a user client and a program for performing the same.

According to an aspect of an embodiment, a method for providing a payment service based on a store's intranet may include providing, by a store client, a payment page in a store depending on a request of a user client, the payment page being provided as the user client is connected to the store's intranet, receiving, by the store client, a virtual code and order information which are input to the payment page, and transmitting, by the store client, the virtual code and the order information to a payment service server over the Internet. The virtual code may be generated as a code matched to a real card number in each unit account by a virtual code generation function stored in the user client or a virtual code generating device and may be used to search a financial institution server or a virtual token verification server for the real card number. The unit count may be set at a specific time interval and may be changed over the time interval.

The payment page may include a first interface for receiving a payment means including the virtual code and a second interface for receiving the order information.

When the virtual code is generated by a virtual code generation program in the user client, the virtual code may be generated at a specific time by the virtual code generation program, may be output on a screen of the user client, and may be copied into the first interface in the payment page on a web browser by a user operation.

When the virtual code is generated by the virtual code generating device separated from the user client, the virtual code may be output on a screen of the virtual code generating device and may be input to the first interface in the payment page on a web browser by a user operation.

When the virtual code is generated by the virtual code generating device separated from the user client, the virtual code may be automatically input to the first interface by the user client as the virtual code is transmitted from the virtual code generating device to the user client through wireless communication in a state where the payment page is output on a screen of the user client.

The method may further include receiving, by the store client, a payment approval result from the payment service server and transmitting, by the store client, the payment approval result to the user client and transmitting, by the store client, guidance information to the user client.

The receiving of the virtual code and the order information may include receiving identification data of the user client together with the virtual code and the order information. The transmitting of the payment approval result and the transmitting of the guidance information may include identifying the user client corresponding to the order information and transmitting the payment approval result and the guidance information to the user client, based on identification data of a plurality of mobile terminals connected to the intranet.

The receiving of the virtual code and the order information may include receiving contact information corresponding to the user client together with the virtual code and the order information. The transmitting of the guidance information may include, when the user client is not connected to the intranet, transmitting the guidance information to contact information matched with the virtual code or the order information.

When a plurality of intranets are scanned by the user client, the payment page may be provided from a store client corresponding to a specific intranet selected by the user client.

According to another aspect of an embodiment, a method for providing a payment service based on a store's intranet may include failing to communicate, by a user client, with a virtual token verification server or a financial institution server at a payment request time of a user and generating, by the user client, a virtual code of a unit account matched with the payment request time based on a virtual code generation function stored in the user client, in a state where the user client is connected to an intranet provided by a store client and providing, by the user client, the virtual code to a clipboard depending on a user operation. The intranet may provide a payment page in a store to the user client in a state where the user client is blocked from the Internet. The payment page may include a first interface for receiving a payment means including the virtual code and a second interface for receiving order information. The virtual code provided to the clipboard may be inserted into the first interface depending on a user operation. The virtual code may be used to search a virtual token verification server or a financial institution server for a real card number. When the real card number is issued from the financial institution server or is registered with the virtual token verification server, the virtual code generation function may be received by the user client. The unit account may be set at a specific time interval and may be changed over the time interval.

The generating of the virtual code may include generating, by the user client, a first code and a second code and generating, by the user client, the virtual code by combining the first code with the second code. The first code and the second code may be used to search the virtual token verification server or the financial institution server for the real card number and may be changed and generated per unit account by a detailed code generation function in the virtual code generation function. The virtual code generation function may be to generate the first code and the second code to correspond to an algorithm of searching the virtual token verification server or the financial institution server for a location where the real card number is stored. The algorithm may adjust a path for searching for the location where the real card number is stored, per unit account.

The first code may be to set a start point of searching for the location where the real card number is stored. The second code may be to set a search path from the start point to the location where the real card number is stored, depending on a specific search scheme.

According to another aspect of an embodiment, a program for providing a payment service based on a store's intranet may be stored in a medium to be combined with hardware and perform the method for providing the payment service based on the store's intranet.

According to another aspect of an embodiment, a system for payment based on a store's intranet may include a wireless communication signal output unit configured to output a wireless communication signal accessible to an intranet connected to a store client, a payment page providing unit configured to provide a payment page in a store depending on a request of a user client, the payment page being provided as the user client is connected to the store's intranet, a payment request information receiving unit configured to receive a virtual code and order information which are input to the payment page, and a payment request information transmitting unit configured to transmit the virtual code and the order information to a payment service server over the Internet. The virtual code may be generated as a code matched to a real card number in each unit account by a virtual code generation function stored in the user client or a virtual code generating device and may be used to search a financial institution server or a virtual token verification server for the real card number. The unit count may be set at a specific time interval and may be changed over the time interval.

According to another aspect of an embodiment, a mobile terminal including a payment function based on a store's intranet may include a virtual code generating unit configured to fail to communicate with a virtual token verification server or a financial institution server at a payment request time of a user and generate a virtual code of a unit account matched with the payment request time based on a virtual code generation function stored in the mobile terminal, in a state where the mobile terminal is blocked from the Internet as the mobile terminal is connected to the intranet and a clipboard providing unit configured to provide the virtual code to a clipboard depending on a user operation. The intranet may provide a payment page in a store to the mobile terminal in a state where the mobile terminal is blocked from the Internet. The payment page may include a first interface for receiving a payment means including the virtual code and a second interface for receiving order information. The virtual code provided to the clipboard may be inserted into the first interface depending on a user operation. The virtual code may be used to search a virtual token verification server or a financial institution server for a real card number. When the real card number is issued from the financial institution server or is registered with the virtual token verification server, the virtual code generation function may be received by the mobile terminal. The unit account may be set at a specific time interval and may be changed over the time interval.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
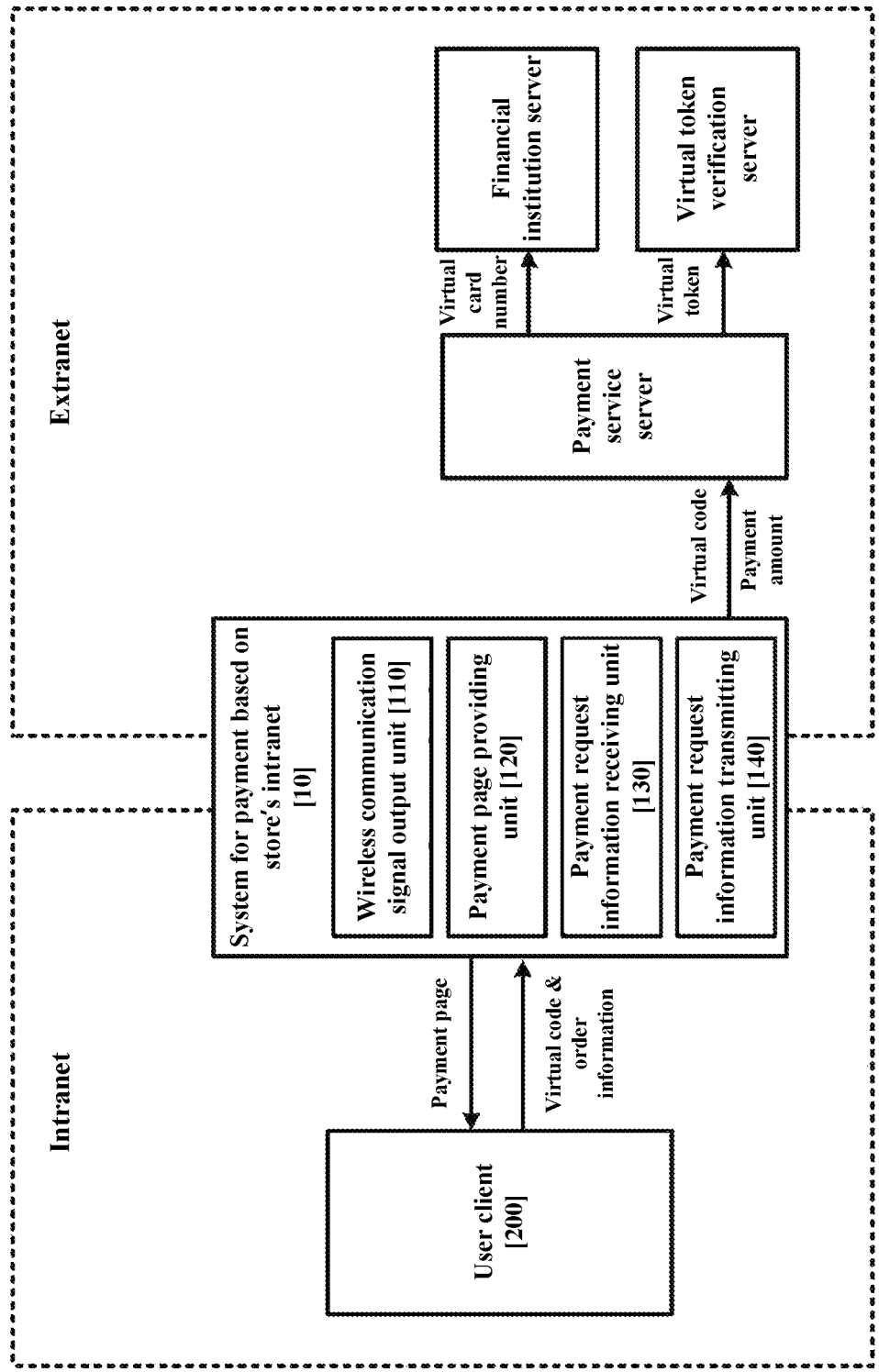
FIG. 1 is a block diagram illustrating a configuration of a system for payment based on a store's intranet according to an embodiment of the inventive concept.

Hereinafter, a description will be given in detail of exemplary embodiments of the inventive concept with reference to the accompanying drawings. Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims. Like reference denotations refer to like elements throughout the specification.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other elements other than stated elements but do not exclude presence of additional elements.

The term "character" in the specification may be an element configuring a code and may include all or some of an uppercase alphabet, a lowercase alphabet, a numeral, a special character, and the like.

The term "code" in the specification may refer to a string where characters are arranged.

The term "card number" in the specification may be used for financial transactions such as payment and may refer to a number which is assigned to a card and is transmitted to a card issuer in a situation such as payment or cancellation.

The "real card number" in the specification may be a number which is assigned to a card of a specific user at a card issuer. In other words, the "real card number" in the specification may refer to a number which is assigned to a typical real card, a mobile card, or the like.

The term "virtual code" in the specification may be a card number temporarily generated to be connected to a real card number and may be a code of specific digits configured with a character including a numeral. The term "virtual code" in the specification may include a virtual card number for searching for a real card number stored in a financial institution server and a virtual token for searching for a real card number stored in a virtual token verification server.

The term "detailed code" in the specification may refer to a partial code included in a virtual token. In other words, if the virtual token is generated by combining a plurality of separately generated codes, the detailed code may refer to a separate code which is separately generated and configures the virtual code.

The term "unit count" in the specification may be a unit defined as being set at a specific time interval and being changed over the time interval. For example, 1 count may be used by being set to a specific time interval (e.g., 1.5 seconds).

The term "virtual code generation function" in the specification may refer to a function used to generate a virtual code.

The term "payment card" in the specification may refer to a card, a virtual code such as a card number of which is changed and output.

The term "payment service server" may include all of servers of operators which connect or assist a payment service between a virtual token verification server and a financial institution server at a virtual token generating device or a store terminal. In other words, the term "payment service server" may correspond to all of a server of a payment gateway (a service provider which acts as a proxy in a transaction with a financial institution on the Internet), a server of a value-added network (VAN) provider, and a server of an acquirer.

The term "financial institution server" in the specification may refer to a server which determines whether to approve payment based on a real card number.

The term "virtual token verification server" may refer to a server which stores a real card number, searches for the real card number based on a virtual token, and provides the found real card number to a payment service server or a financial institution server.

Hereinafter, a description will be given in detail of a system for payment based on a store's intranet, a mobile terminal including a payment function based on the store's intranet, a method for providing a payment service based on the store's intranet, and a program for performing the same, according to various embodiments of the inventive concept.

FIG. 1 is a block diagram illustrating a configuration of a system for payment based on a store's intranet according to an embodiment of the inventive concept.

Referring to FIG. 1, a system 10 for payment based on a store's intranet according to an embodiment of the inventive concept may include a wireless communication signal output unit 110, a payment page providing unit 120, a payment request information receiving unit 130, and a payment request information transmitting unit 140.

The wireless communication signal output unit 110 may play a role in outputting a wireless communication signal capable of accessing an intranet connected to a store client. The wireless communication signal output unit 110 may be included in the store client or may be one or more access points (APs) connected to the store client. The wireless communication signal output unit 110 may output a wireless communication signal capable of accessing the intranet in or around a store (e.g., when the store is a food truck, a range where a wireless communication signal of an intranet around the food truck may reach). As a user client 200 scans and connects a wireless communication signal for a store's intranet, the store client may establish a connection with the user client 200. Since the intranet is able to receive information from the store client and transmit information to the store client and is unable to use the Internet, when the user client 200 is connected to the intranet, access to the Internet may be blocked.

The payment page providing unit 120 may play a role in providing a payment page in the store based on a request of the user client 200. As the user client 200 is connected to the store's intranet, the payment page may be provided. As an embodiment, the payment page may include a first interface for receiving a virtual code corresponding to information associated with a payment means and a second interface for selecting an order item. The first interface and the second interface may be provided in one page or may be sequentially provided.

The payment request information receiving unit 130 may play a role in receiving a virtual code and order information which are input to the payment page. In other words, the payment request information receiving unit 130 may receive the virtual code and the order information, which are input to the payment page, from the user client 200 based on an operation of a user (e.g., selection of the user on an order complete button). The virtual code may be generated as a code matched to a real card number in each unit count by a virtual code generation function which is stored in the user client 200 or a virtual code generating device and may be used to search a financial institution server or a virtual token verification server for a real card number.

Furthermore, as the payment page further includes an interface (e.g., an interface for receiving identification information) other than the first interface and the second interface, the payment request information receiving unit 130 may further receive identification data of the user client 200 or contact information corresponding to the user client 200.

The payment request information transmitting unit 140 may play a role in transmitting the virtual code and the order information to a payment service server over the Internet. The payment request information transmitting unit 140 may transmit the virtual code and the order information (e.g., information about the amount of money corresponding to an order item) to the payment service server to approve a payment request received from the user client 200.

Figure 2:
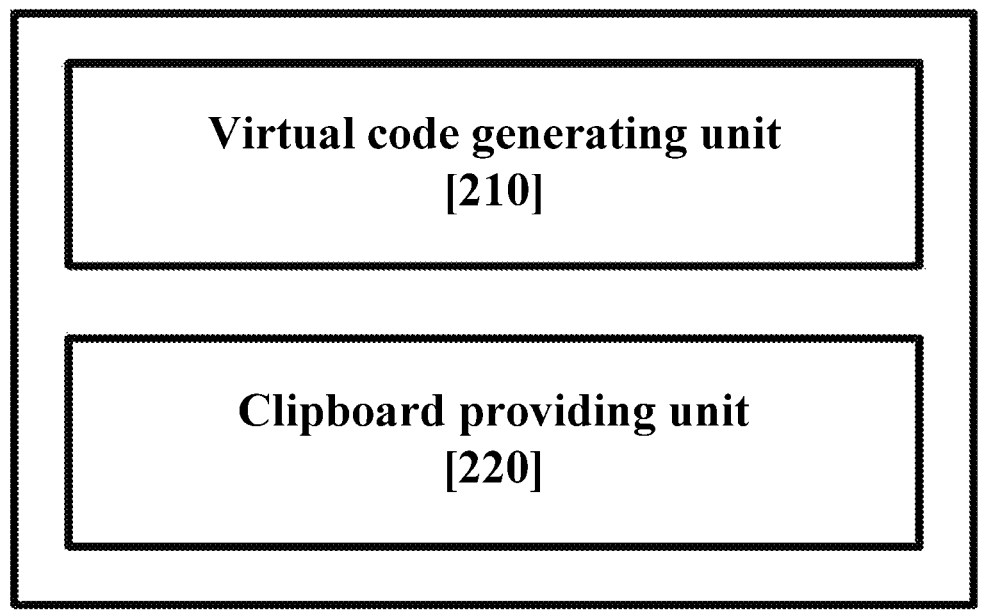
FIG. 2 is a block diagram illustrating a configuration of a mobile terminal including a payment function based on a store's intranet according to another embodiment of the inventive concept.

FIG. 2 is a block diagram illustrating a configuration of a mobile terminal including a payment function based on a store's intranet according to another embodiment of the inventive concept.

Referring to FIG. 2, a mobile terminal 200 including a payment function based on a store's intranet according to another embodiment of the inventive concept may include a virtual code generating unit 210 and a clipboard providing unit 220.

The virtual code generating unit 210 may play a role in generating a virtual code of a unit count matched with a payment request time of a user at the payment request time. In a state where a connection with the Internet is blocked as the mobile terminal 200 is connected to an intranet connected with a store client and where the mobile terminal 200 does not communicate with a virtual token verification server or a financial institution server, the virtual code generating unit 210 may generate a virtual code based on a virtual code generation function stored in the mobile terminal 200. The intranet may provide a payment page in a store to the mobile terminal 200 in a state where the mobile terminal 200 is blocked from the Internet. As an embodiment, the payment page may include a first interface for receiving a payment means including the virtual code and a second interface for receiving order information.

The virtual code may be used to search the virtual token verification server or the financial server for a real card number. The virtual code may be configured with various structures. A description will be given in detail of the structure of the virtual code.

While the mobile terminal 200 is issued a real card number from the financial institution server or registers the real card number with the virtual token verification server, it may receive a virtual code generation function used to generate a virtual code.

The clipboard providing unit 220 may play a role in providing the virtual code to a clipboard depending on a user operation. In other words, the clipboard providing unit 220 may copy the virtual code generated by the virtual code generating unit 210 into the clipboard. As the user specifies a virtual code output on a screen of the user terminal 200 and requests the clipboard providing unit 220 to copy the virtual code, the clipboard providing unit 220 may provide the virtual code to the clipboard. Alternatively, as the user operates a button for requesting to copy the virtual code irrespective of whether the virtual code is output on the screen, the clipboard providing unit 220 may provide the virtual code to the clipboard. The user may insert the virtual code copied into the clipboard into the first interface of the payment page and may proceed with payment using the virtual code. In other words, the virtual code provided to the clipboard may be inserted into the first interface of the payment page based on a user operation.

Figure 3:
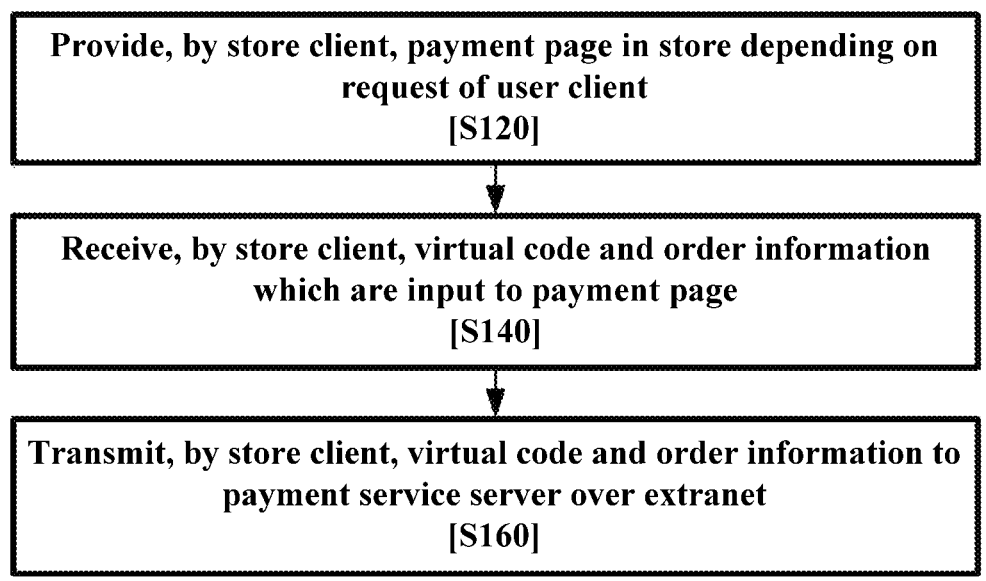
FIGS. 3 to 5 are flowcharts illustrating a method for providing a payment service based on a store's intranet at a store client according to another embodiment of the inventive concept.
Figure 4:
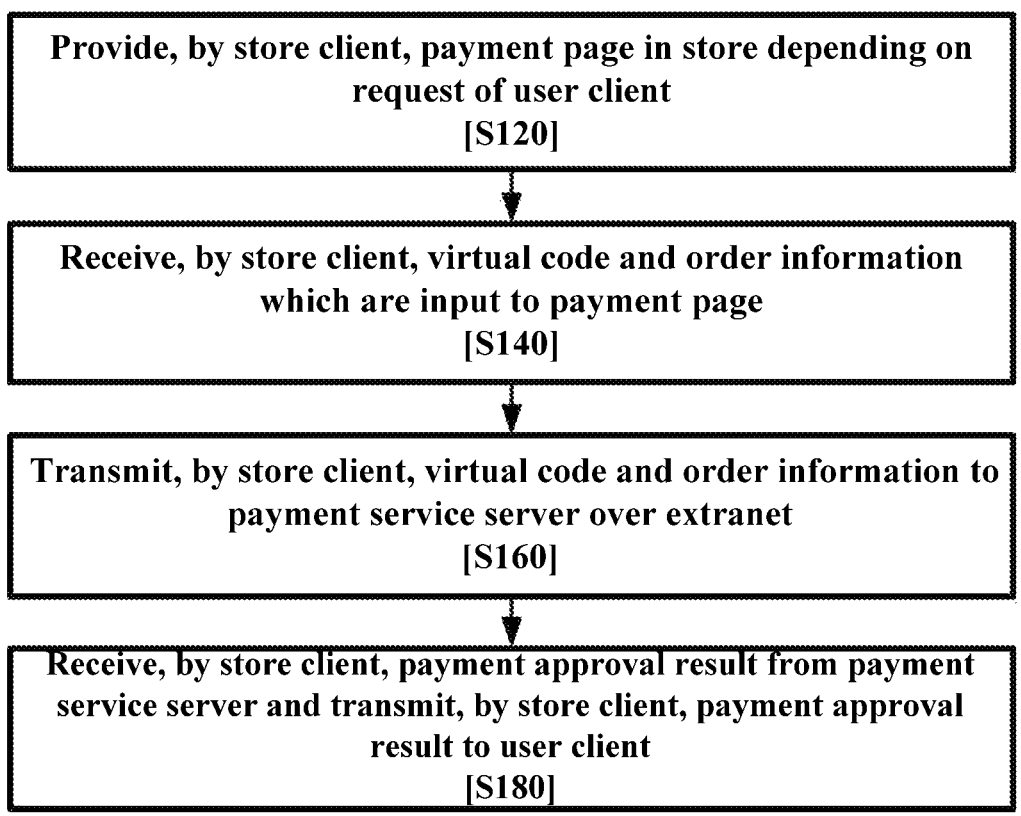
Figure 5:
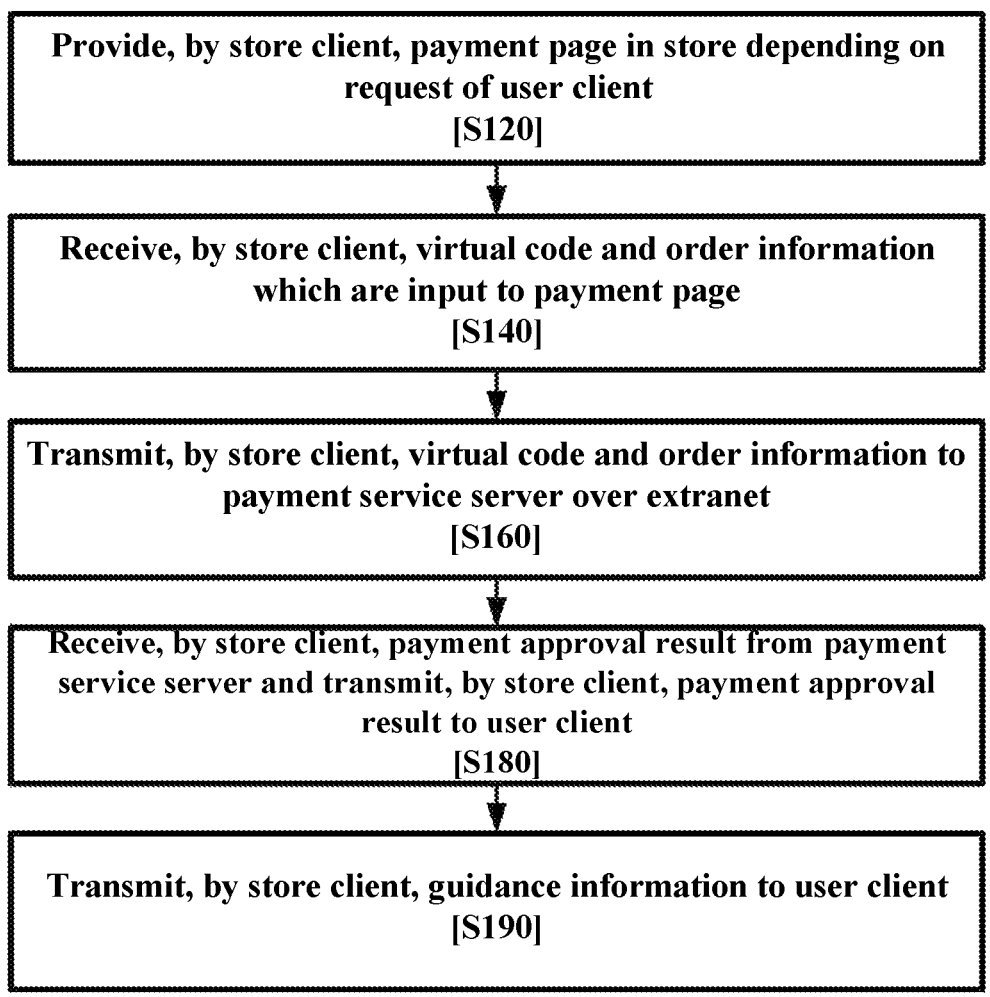

FIGS. 3 to 5 are flowcharts illustrating a method for providing a payment service based on a store's intranet at a store client according to another embodiment of the inventive concept.

Referring to FIG. 3, the method for providing the payment service based on the store's intranet according to another embodiment of the inventive concept may include providing (S120), by a store client, a payment page in a store depending on a request of a user client, receiving (S140), by the store client, a virtual code and order information which are input to the payment page, and transmitting (S160), by the store client, the virtual code and the order information to a payment service server over the Internet. Hereinafter, a description will be given in detail of each operation.

In operation S120, the store client may provide the payment page in the store depending on the request of the user client. The payment page may be provided as the user client is connected to the store's intranet and may be a page for receiving a payment means and order information. In other words, as the user client is connected to an intranet corresponding to a specific store, the store client may provide the payment page to the user client. As the user client is connected to the intranet of the specific store, the payment page may be automatically output on a screen of the user client. For example, after the user client drives a program (e.g., a web browser) capable of automatically displaying the payment page on the screen, it may receive payment page data over the intranet from the store client and may display the received payment page data on the screen.

As an embodiment, the payment page may include a first interface for receiving a payment means including a virtual code and a second interface for receiving order information. The payment page may represent the first interface and the second interface on one page or may sequentially provide the first interface and the second interface.

For example, the store client may first provide the second interface to the user client over the intranet to determine order information and may then provide the first interface to the user client. Thus, since the user client provides the first interface for receiving the virtual code after a time taken to determine an order item elapses in a state where it is connected to the intranet, it may prevent a virtual code generated in real time through wireless communication with the outside rather than the store client from being leaked. Furthermore, when a virtual code is changed and generated per unit count, since a previously generated virtual code is not valid over a time taken to determine an order item, it may prevent payment from proceeding using a virtual code generated and leaked before it is connected to the intranet. Furthermore, in contrast to a manner capable of receiving or generating a virtual code only when the user client is connected to the Internet, when a virtual code generation function for generating a virtual code capable of searching a financial institution server or a virtual token verification server for a real card number is included in a payment card or the user client, the user client may generate a virtual code capable of being generated at a payment request time and approving payment (e.g., a virtual code capable of searching for a location where the real card number is stored, by using a payment request time as a search start point) irrespective of a length of a time taken to determine an order item in a state where it is connected to the intranet in which communication with the outside except for the store client is blocked.

Furthermore, as an embodiment, when obtaining signals from a plurality of intranets for each store, the user client may select an intranet of a specific store by a user operation and may receive a payment page for placing an order with the store from the selected store client. In other words, when a plurality of intranets are scanned by the user client, the payment page may be provided from the store client corresponding to the specific intranet selected by the user client. For example, when each store is a food truck or a food court store, each store may be equipped with a store client and each store client may output a signal of an intranet around the each store client. In this case, a user client located adjacent to a plurality of stores may receive a wireless signal of an intranet of each store and may select an intranet of a store with which a user wants to place an order to be connected to the selected intranet.

In operation S140, the store client may receive the virtual code and the order information which are input to the payment page. The virtual code may be generated as a code matched to a real card number in each unit count by a virtual code generation function stored in the user client or a virtual code generating device (e.g., a payment card).

The virtual code may be used to search the financial institution server or the virtual token verification server for a real card number and may inform a user of a path of searching for a location where the real card number is stored. The virtual code may be configured with various structures.

The virtual code may be generated by combining one or more detailed codes. As an embodiment, the virtual code may be generated by combining a plurality of detailed codes according to a specific rule. The virtual code generation function may include a rule (i.e., a detailed code combination function) for combining the plurality of detailed codes.

A variety of manners may be applied to the manner of generating the one virtual code by combining the plurality of detailed codes. As an example of the detailed code combination function, a virtual code generating unit 120 of FIG. 2 may generate the virtual code in a manner of alternately arranging a first code of N digits and a second code of the N digits. Further, as another example, the detailed code combination function may be a function of combining the second code behind the first code. As a detailed code included in a virtual function is increased, the detailed code combination function may be generated in various manners.

One or more detailed codes in the virtual code may be generated by a detailed code generation function included in the virtual code generation function in the user client or the virtual code generating device. For example, the virtual code generation function may be to generate a plurality of detailed codes using a plurality of detailed code generation functions and generate a virtual code using a detailed code combination function for combining the plurality of detailed codes.

The virtual code may be configured with the plurality of detailed codes. As an embodiment, the virtual code may be generated by a combination of a first code and a second code. Each of the first code and the second code may be used to search the financial institution server or the virtual token verification server for a location of a real card number. For example, the first code may be a code for setting a start point for searching the financial institution server or the virtual token verification server for a location where a real card number is stored, and the second code may be a code for setting a search path from the start point to the location where the real card number is stored, according to a specific search scheme.

Further, as another embodiment, if the first code of the N digits or the second code of the N digits is generated with M characters, the virtual code generation function may include a first function or a second function for providing different $M^N$ codes as the first code or the second code sequentially changed per unit count. In other words, the first function or the second function may be a function of generating the $M^N$ codes not to be duplicated as a count is increased and may be to generate a specific one of the $M^N$ codes as the first code or the second code in a count corresponding to a specific time. Thus, a virtual code generating means may fail to duplicate and generate the same first or second code within $M^N$ counts (i.e., a time length corresponding to the $M^N$ counts) and may generate a new detailed code (i.e., the first code and the second code) per unit count to generate a new virtual code per unit count. The first code and the second code may have correlation for searching the financial institution server or the virtual token verification server for a location where a real card number is stored. However, the virtual code generating device or the user client may include the first function for generating the first code and the second function for generating the second code as the detailed code generation function to enhance security and may fail to include data for correlation between the first code and the second code.

In detail, if $M^N$ codes are used as the first code or the second code as the first or second code of the N digits is generated using the M characters, the virtual code generation function may be to match each code for each count from an initial time when a detailed code generation function is driven. For example, if a unit count is set to 1 second, the virtual code generation function may be to match different $M^N$ codes every second from a time when the detailed code generation function is initially driven. When a period when a specific detailed code generation function is used or a use period of the virtual code generating device (e.g., an expiration date of a payment card which generates a virtual code) is set to a time length which is shorter than a time length (e.g., $M^N$ seconds when 1 count is 1 second) corresponding to $M^N$ counts, the same code of the first code or the second code may fail to be duplicated and generated during the use period. In other words, when a count is increased over time, if a user requests the virtual code generating device or the user client to generate a virtual code at a specific time, the virtual code generating device or the user client may generate a code value matched to a count corresponding to the specific time as the first code or the second code.

Furthermore, the virtual code may further include a fixed code. In other words, the virtual code may include the fixed code which is not changed for distinguishing a group together with a plurality of detailed codes. The fixed code may include a code for determining a card issuer or a card type corresponding to the real card number or a code for identifying that the real card number corresponds to a virtual code. The fixed code may be combined with a predetermined location in the virtual code. For example, when a virtual code generation function is assigned for each card type of a specific card issuer, the virtual code generating device or the user client may use the first 6 digits indicating a card issuer and a card type in a card number as a fixed code. The financial institution server or the virtual token verification server may identify a specific card issuer or a specific card type to which the virtual code generation function in the virtual code generating device or the user client is applied. In other words, the fixed code may be a code for determining a card issuer or a card type corresponding to the real card number.

Furthermore, as another embodiment, when the virtual code corresponds to a virtual token, the fixed code may include information or a code for identifying that the virtual code corresponds to the virtual token. When only a virtual token is received, a payment service server (e.g., a VAN provider server or a PG server) or a payment terminal (e.g., a kiosk device or a point of sales (POS) device) is unable to determine the virtual token is any code among a real card number, a virtual card number which is actually matched and used with the real card number by the financial institution server, or a virtual token verified by the virtual token verification server, the virtual code generating device or the user client may include information or a code capable of identifying that the virtual token is a virtual token in a fixed code. For example, the virtual code generating device or the user client (i.e., a mobile terminal) may utilize a code, corresponding to an issuer identification number in a real card number of the user, which is capable of identifying a virtual token, as a fixed code. For example, the virtual code generating device or the user client may assign and use a new code matched to the issuer identification number as a fixed code using 6 digits corresponding to the issuer identification number in the real card number. In this case, the virtual token verification server may store a matching relationship between the fixed code and the issuer identification number in the same manner as the virtual code generating device or the user client and may determine a card issuer and a card type of the real card number based on the fixed code when receiving a virtual token.

Furthermore, the fixed code may be combined with a predetermined location in the virtual code. When a virtual code generation function is assigned for each card type group, the virtual token verification server or the financial institution server may first extract a fixed code from the virtual code and may determine a card type group. Thus, the fixed code may be appended to a predetermined location in the virtual code (e.g., the same location as an issuer identification number of a real card number) to be separable without a separate function.

Furthermore, as an embodiment, the virtual code generating device or the user client may generate a detailed code to become a code of the same digits as a real card number by combining a plurality of detailed codes with a fixed code. To use a virtual code while maintaining a conventional financial transaction system (e.g., in case of payment in a store, a POS device and a VAN provider server) without change, the virtual code generating device or the user client should generate a code having the same digits as the real card number as a virtual code. To this end, the virtual code generating device or the user client may divide digits except for a fixed code for determining a card issuer and a card type of the card issuer and may utilize the divided digits as digits of a plurality of detailed codes. For example, when the real card number has a 16-digit card identification number and includes a first code and a second code as a detailed code, the virtual code generating device or the user client may equally divide 10 digits except for a 6-digit fixed code among 16 digits to generate a first code of 5 digits and a second code of 5 digits. Thereafter, the virtual code generating device or the user client may generate a card identification number of a virtual code by combining the first code with the second code under a specific rule using the detailed code combination function and appending the fixed code to a front portion such as a card identification number of the real card number.

Further, the virtual code generating device or the user client may generate a virtual code configured with a detailed code using digits of the card identification number of the card number and an expiration date. In other words, the virtual code generating device or the user client may maintain 6 digits corresponding to an issuer identification number of the real card number as a fixed code and may assign the other 14 digits to a plurality of detailed codes, among the card identification number of 16 digits and the expiration date of 4 digits. A detailed code generating unit may generate a detailed code matched with each of the assigned digits.

Furthermore, for example, the virtual code generating device or the user client may utilize a card identification number of the real card number, an expiration date, and a card security code as digits to be assigned to a detailed code in a virtual code. For example, the virtual code generating device or the user client may maintain 6 digits corresponding to the issuer identification number of the real card number as a fixed code and may assign the other 10 digits of the card identification number, 4 digits of the expiration date, and 3 digits of the card security code to respective detailed codes.

Moreover, for example, the virtual code generating device or the user client may represent a detailed code and a fixed code of a virtual code using only the card identification number. In this case, the virtual code generating device or the user client may assign different digits to a plurality of detailed codes. In other words, when a virtual code includes a fixed code, a first code, and a second code and when the fixed code, the first code, and the second code are generated by only using digits of the card identification number, the virtual code generating device or the user client may divide and assign 9 digits among digits except for 6 digits assigned to the fixed code into the first code and the second code. To be applied to both of when the card identification number has 15 digits and when the card identification number has 16 digits, the virtual code generation function may be to assign only 9 digits of the card identification number to the first code and the second code. For example, the virtual code generation function may be to assign 6 digits to the first code and assign 3 digits to the second code, among 9 digits. As such, expressing a code in which a virtual code is configured with only the card identification number in the entire card number, the number of characters which should be input in a situation where the user directly inputs the card number may be reduced. Further, the virtual code generating device may utilize the expiration date and the card security code as another purpose capable of increasing security.

Furthermore, the virtual code may be generated itself without communication with the outside in the user client or the virtual code generating device (e.g., a payment card including a virtual code generation function). When a virtual code is generated by a virtual code generation program in the user client, since communication with the outside is blocked as the user client is connected with an intranet, the user client may fail to use a manner of receiving a virtual code in real time from an external server. Thus, the user client may generate a virtual code capable of searching the financial institution server or the virtual token verification server for a rear card number, by only a virtual code generation function stored in the user client in a state where communication with the outside is not performed. When a location where the rear card number is stored is changed per payment request time or when a search path to the location where the real card number is stored is changed, the user client may generate a virtual code including information capable of searching for the location where the rear card number is stored, at each payment request time.

Furthermore, when a virtual code is generated by the virtual code generating device (i.e., a payment card) separated from the user client, the virtual code generating device may generate the virtual code based on a virtual code generation function stored in the virtual code generating device in a state where wireless communication with the outside is blocked to enhance security. Since the user client receives the virtual code generated by the virtual code generating device, it may use the virtual code in a state where it is not connected with the Internet.

A variety of manners may be applied to a manner of inputting a virtual code to the first interface in the payment page provided to the user client. As an embodiment, when the virtual code is generated by a virtual code generation program in the user client, it may be generated at a specific time by the virtual code generation program and may be output on a screen of the user client, and may be copied into the first interface in the payment page on a web browser by a user operation.

Furthermore, as another embodiment, when the virtual code is generated by the virtual code generating device separated from the user client, it may be output on a screen of the virtual code generating device and may be directly input to the first interface in the payment page on the web browser by a user operation.

Furthermore, as another embodiment, when the virtual code is generated by the virtual code generating device separated from the user client, it may be transmitted from the virtual code generating device to the user client through wireless communication in a state where a payment page is output on a screen of the user client to be automatically input to the first interface of the user client. For example, when the virtual code generating device and the user client may perform contact wireless communication (e.g., near field communication (NFC)), the virtual code generating device may generate a virtual code at a payment request time depending on a user operation. As the user client is in contact with the virtual code generating device, the user client may receive the virtual code through the contact wireless communication from the virtual code generating device and may automatically input the virtual code received through the contact wireless communication to a first interface on the screen.

Furthermore, as another embodiment, when the virtual code is generated by the virtual code generating device separated from the user client, the virtual code generating device may be a payment card of the user for generating a virtual code or a mobile terminal of another user. For example, the payment card of the user may generate a bar code or a quick response (QR) code based on a virtual code at a time requested to generate the virtual code and may display the generated bar code or QR code on a display included in the payment card. The user client may capture the bar code or the QR code corresponding to the virtual code using its camera to obtain the virtual code to be used upon placing an order.

Furthermore, for example, when a user client (e.g., a first user client) used to place an order is different from a user client (e.g., a second user client) used to generate a virtual code for payment, the second user client may generate the virtual code using a virtual code generation program in the second user client and may display a bar code or a QR code corresponding to the virtual code on its screen. The first user client may obtain the virtual code by capturing the bar code or the QR code displayed on the screen of the second user client and may input the virtual code to a payment page displayed on the first user screen. The first user client and the second user client may be different mobile terminals of a specific user or may be mobile terminals of other users.

Further, as an embodiment, in operation S140, the store client may receive identification data of the user client together with the virtual code and the order information. Since the store client receives the virtual code and the order information using the intranet from a plurality of user clients, it may match and receive identification data of a user client with the order information or the virtual code to distinguish the user client corresponding to the order information. For example, the identification data may be an identification value assigned in the user client or may be a user ID input when the user joins a payment service or when he or she places an order.

Moreover, as an embodiment, in operation S140, the store client may receive contact information corresponding to the user client together with the virtual code and the order information. When the user client ends the connection with the intranet, since the store client is unable to notify the user client of information associated with the order information, it may receive the contact information together when receiving the virtual code or the order information from the user client. To this end, the payment page may further include a third interface for receiving the contact information.

In operation S160, the store client may transmit the virtual code and the order information to the payment service server over the Internet. Since the store client is connected to both the intranet and the Internet, when receiving the virtual code and the order information from a specific user client over the intranet, it may transmit the virtual code and information about a payment amount to the payment service server to proceed with a payment process. The payment service server may determine a financial institution server or a virtual token verification server to which the virtual code should be transmitted, based on the detailed code included in the virtual code. In detail, since the virtual code includes a fixed code having information associated with the financial institution server which issues a real card number or the virtual token verification server (i.e., a server of a virtual token service provider) which stores the real card number, the payment service server may determine a server to which the virtual code and the information about the payment amount should be transmitted, through the fixed code.

Further, as another embodiment, as shown in FIG. 4, the method may further include receiving, by the store client, a payment approval result from the payment service server and transmitting (S180), by the store client, the payment approval result to the user client. For example, the store client may identify the user client corresponding to the order information based on identification data about each user client (i.e., each mobile terminal) and may receive the payment approval result, in a state where a plurality of user clients including a user client corresponding to specific order information are connected over the intranet. Since a user maintains the user client in a state where the user client is connected to the intranet until receiving the payment approval result, the store client may identify a target to transmit the payment approval result based on the identification data of the user client, obtained upon placing an order. In this case, the store client may transmit a receipt for an order result, an order number, or the like to a specific user client. The user client may store a receipt image or an image on which an order number is displayed, in a payment page.

Further, as another embodiment, as shown in FIG. 5, the method may further include transmitting (S190), by the store client, guidance information to the user client. The guidance information may be information of which the user should be notified in connection with the order information. For example, the guidance information may be information for providing a notification that a menu corresponding to the order information is completed.

As an embodiment, the store client may identify a user client corresponding to the order information and may transmit the guidance information to the identified user client, based on identification data of a plurality of user clients connected to the intranet (e.g., an eigen value stored in a mobile terminal, a user ID set when a user places an order, or the like).

Furthermore, as another embodiment, when the user client is not connected to the intranet, it may transmit guidance information to contact information matched with the virtual code or the order information. Since the user client continues connecting to the intranet, since it is unable to access the Internet, the user may feel uncomfortable. Thus, to provide guidance information when the user client blocks a connection with the intranet and connects to the Internet after completing an order (i.e., receiving a payment approval result), the store client may receive contact information upon placing an order from the user client and may transmit the guidance information to the contact information. The contact information may include a telephone number, a social networking service (SNS) ID, or the like capable of transmitting a text message.

Further, as another embodiment, the payment page may further include an order situation guidance interface. For example, the order situation guidance interface may be displayed on the same page as the first interface and the second interface. For example, the order situation guidance interface may be displayed on an uppermost end of the payment page, and a user who performs an order procedure in real time may be notified of the order situation guidance interface. To this end, the store client may collect an order situation in real time to generate the order situation guidance interface. The order situation guidance interface may display identification data (e.g., a user's nickname or the like) which is input by the user upon placing an order or may display an order number provided to the user client upon placing an order.

Furthermore, as an embodiment, the order situation guidance interface may be displayed on a separate page independent of the first interface and the second interface. In other words, the order situation guidance interface may be generated as a separate tap capable of being selected by the user in the payment page.

As the payment page includes the order situation guidance interface, after completing an order, while the user blocks a connection with the intranet and uses the Internet (e.g., wireless-fidelity (Wi-Fi), long term evolution (LTE), or 3 generation (3G) communication for external communication in a store), he or she may connect the user client to the intranet again if necessary to verify whether an order (e.g., food) is served and may verify whether the order is served through the order situation guidance interface. As an embodiment, the store client may be a payment device installed in an aircraft. The store client (e.g., a payment device installed in the aircraft) may create an intranet capable of being connected to a user client which sets an airplane mode in the airplane. When an aircraft intranet is selected by the user client, the store client may provide a payment page to the user client. In this case, the payment page may be a page capable of proceeding with payment for the purchase of duty-free goods or a paid inflight service. The store client may receive a virtual code and order information input to an interface in a payment from the user client. Since the user client is in a state where it is impossible for communication with an external server because the user boards an aircraft, it may generate a virtual code using a virtual code generation function included in the user client. The store client may transmit the virtual code and the order information to the Internet over an aircraft communication network. In other words, since having an influence on operating the aircraft, the user client may fail to individually communicate with an external server for payment and only the store client installed in the aircraft may use the Internet based on payment request information received over the intranet from each user client. Thus, since the store client verifies a normal code from a financial institution server or a virtual token verification server upon payment in the aircraft, it may prevent a payment accident from occurring by a lost card or the like in the aircraft. Further, as a virtual code is used, although information about a payment means is exposed to other people in a process of transmitting payment request information from the aircraft to the external server, it may fail to be stolen by the other people. Further, since each of users simply places an order for a paid inflight service or duty-free goods in the aircraft using his or her user client, congestion situations in the aircraft may be addressed and user convenience may be provided.

Furthermore, as another embodiment, a manner of providing, by the virtual code generating device, a virtual code using a virtual code generation function stored in the virtual code generating device separated from the user client and inputting, by the virtual code generating device, the virtual code to a payment page displayed on the user client or a manner of inputting a virtual code to a payment page provided on a display device installed in an aircraft seat wiredly or wirelessly connected to an aircraft intranet may be applied as well as the manner of generating and providing, by the user client, the virtual code.

Figure 6:
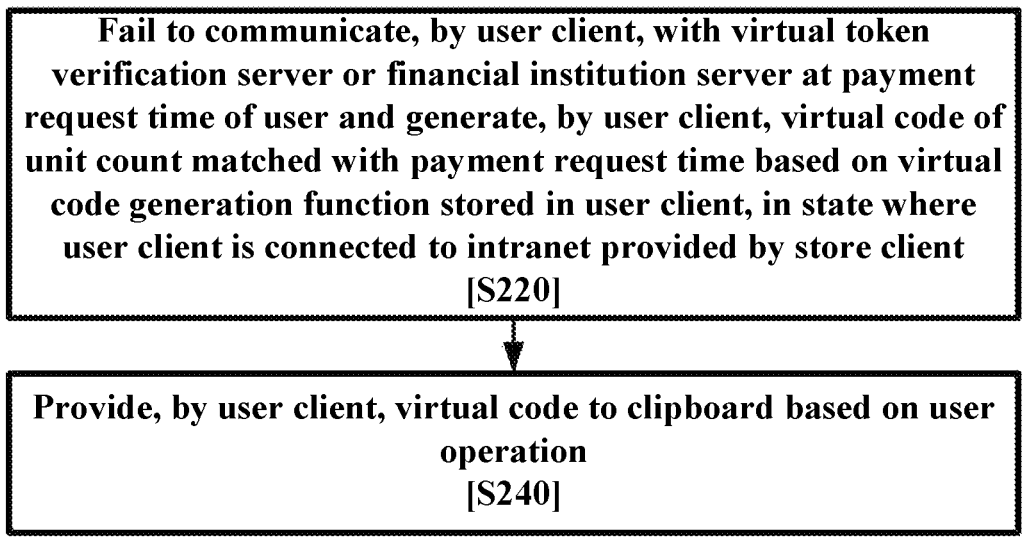
FIG. 6 is a flowchart illustrating a method for providing a payment service based on a store's intranet at a user client according to another embodiment of the inventive concept.

FIG. 6 is a flowchart illustrating a method for providing a payment service based on a store's intranet at a user client according to another embodiment of the inventive concept.

Referring to FIG. 6, the method for providing the payment service based on the store's intranet according to another embodiment of the inventive concept may include failing (S220) to communicate, by a user client, with a virtual token verification server or a financial institution server at a payment request time of a user and generating, by the user client, a virtual code of a unit count matched with the payment request time based on a virtual code generation function stored in the user client, in a state where the user client is connected to an intranet provided by a store client and providing (S240), by the user client, the virtual code to a clipboard depending on a user operation.

In operation S220, in the state where the user client is connected to the intranet provided by the store client, the user client may fail to communicate with the virtual token verification server or the financial institution server at the payment request time of the user and may generate the virtual code of the unit count matched with the payment request time based on the virtual code generation function stored in the user client.

The user client may be connected to the intranet for a specific store. The user client may select and connect an intranet in which identification information of the specific store is described among wireless communication networks connectable to the user client. The intranet may be able to perform only communication with the store client, and communication with the outside of a store may be blocked. In other words, as the user client is connected to the intranet, it may be in a state where a connection with the Internet is blocked. For example, since a network (i.e., an internet-capable Wi-Fi network) corresponding to the Internet is not connected as the user client selects a network corresponding to the intranet and since a wireless communication function such as 3G or LTE is deactivated, communication with a server or a device except for the store client may be impossible.

The user client may receive a payment page in a store over the intranet of the specific store. For example, the payment page may be automatically output on a webpage installed in the user client.

As an embodiment, the payment page may include a first interface for receiving a payment means including the virtual code or a second interface for receiving order information. A real card number or a virtual code (e.g., a virtual card number or a virtual token) may be directly input or copied into the first interface by a user. One or more menus are arranged on the second interface, and a menu for which the user places an order may be selected on the second interface.

When the user client performs payment at a specific time using the virtual code, it may drive a program including the virtual code generation function (hereinafter referred to as "virtual code generation program") to generate the virtual code. For example, after the user checks a menu displayed on a screen of the user client and determines an order item, he or she may drive the virtual code generation program to obtain a virtual code necessary to proceed with payment. The virtual code generation program may be embedded in the user client or may be installed by the user. For example, the user may install an app card of a specific card issuer which provides a virtual card number corresponding to a real card number in the user client. Further, a producer of the user client may embed a specific virtual token generation program in the user client, or the user client may receive a virtual code generation function (i.e., a virtual token generation function) when registering a real card number with a virtual token service. In other words, as a real card number is issued from the financial institution server or is registered with the virtual token server, the user client may receive the virtual code generation function.

In this case, the user client may generate a virtual code at a payment request time through the virtual code generation program. Since the user client is connected to the intranet to proceed with payment, it may fail to communicate with an external server (e.g., a virtual token verification server or a financial institution server) at a payment request time of the user and may generate the virtual code of the unit count matched with the payment request time based on the virtual code generation function stored in the user client.

The virtual code may be used to search the virtual token verification server or the financial institution server for a real card number. As an embodiment, the virtual code may play a role in providing a path to search the virtual token verification server or the financial institution server for a location where a real card number is stored.

The virtual code generation program of the user client may generate the virtual code in various forms. As an embodiment, operation S220 may include generating, by the user client, a first code and a second code and generating, by the user client, the virtual code by combining the first code with the second code. The first code and the second code may be used to search the virtual token verification server or the financial institution server for a location where the real card number is stored and may be changed and generated per unit count by a detailed code generation function in the virtual code generation function. The virtual code generation function may be to generate the first code and the second code to correspond to an algorithm of searching the virtual token verification server or the financial institution server for a location where the real card number is stored. The algorithm may adjust a path for searching for the location where the real card number is stored per unit count.

Further, as another embodiment, the first code is to set a start point for searching for the location where the real card is stored, and the second code may be to set a search path from the start point to the location where the real card number is stored. The detailed description described above in connection with a format of the virtual code will be omitted.

In operation S240, the user client may provide the virtual code to the clipboard depending on the user operation. For example, as the user performs an operation of selecting and copying a region of a virtual code output on a screen by the virtual code generation program or operates a virtual code copy function button, the user client may copy the virtual code into the clipboard.

Thereafter, the user client may insert the virtual code copied into the clipboard into the first interface in the payment page depending on a user operation. For example, the user client may copy the virtual code into the clipboard in the virtual code generation program and may change from a virtual code generation program window to a web browser window which provides a payment page, depending on a user operation. The user client may receive a clipboard insertion request (i.e., a user operation) for the first interface from the user and may input the virtual code in the clipboard to the first interface.

As the user client inputs order information and the virtual code which is a payment means to the payment page and receives a submission request, it may transmit the order information and the virtual code to a store client over the intranet.

The above-mentioned method for providing the payment service based on the store's intranet according to an embodiment of the inventive concept may be implemented as a program (or application) which is combined with hardware to be executed and may be stored in a medium.

For the computer to read the program and execute the methods implemented with the program, the above-mentioned program may include a code coded into a computer language such as C, C++, Java, or a machine language readable through a device interface of the computer by a processor (CPU) of the computer. Such a code may include a functional code associated with a function and the like defining functions necessary for executing the methods and may include a control code associated with an execution procedure necessary for the processor of the computer to execute the functions according to a procedure. Further, such a code may further include a code associated with memory reference about whether additional information or media necessary for the processor of the computer to execute the functions is referred at any location (address number) of an internal or external memory of the computer. Further, if it is necessary for the processor of the computer to communicate with any computer or server located in a remote place to execute the functions, the code may further include a communication related code about how communication is performed with any computer or server located in a remote place using a communication module of the computer and whether to transmit and receive any information or media upon communication.

The medium may refer to a device-readable medium which stores data on a semipermanent basis rather than a medium, such as a register, a cache, or a memory, which stores data during a short moment. In detail, the medium may be, for example, but is not limited to, a read only memory (ROM), a random access memory (RAM), a compact disc ROM (CD-ROM), a magnetic tape, a floppy disc, an optical data storage device, or the like. In other words, the program may be stored in various storage media on various servers accessible by the computer or various storage media on the computer of the user. The medium may be distributed to a computer system connected over a network and may store a computer-readable code on a distributed basis.

According to an embodiment of the inventive concept, the user may place an order using his or her user client within a range where a wireless signal of an intranet is reached without the necessity of directly waiting in line at a POS device for an order and payment. Thus, the number of clerks who take an order in a store may be reduced.

Furthermore, since a virtual code rather than a real card number is used for payment over the intranet, although the virtual code is leaked to other people in the process of requesting the intranet to perform payment, the real card number may fail to stolen by the other people.

Furthermore, since payment is performed based on a virtual code stored in a user client or a virtual code generating device, the user client may perform payment although the user client is blocked from the Internet as it is connected to the intranet or although there is no Internet around the user client.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for providing a payment service based on a store's intranet, the method comprising:
    receiving, by a store client including a processor and memory, from a user client including a processor and memory, a request for a store payment page;
    providing, by the store client, data of the store payment page to the user client through the store's intranet;
    setting, by the user client that is connected with the store's intranet but is blocked from the Internet, a unit count at a time interval;
    generating, by the user client that is connected with the store's intranet but is blocked from the Internet, through a virtual code generation function stored in the user client, a virtual code that is matched in each unit account to a card number that is assigned to a card by a card issuer and includes information capable of searching a financial institution server or a virtual token verification server corresponding to the card number;
    changing, by the user client that is connected with the store's intranet but is blocked from the Internet, the unit count over the time interval;
    inputting, to the store client, through the store payment page, the virtual code and order information; and
    transmitting, by the store client that is connected with the store's intranet and is also connected with the Internet, the virtual code and the order information to a payment service server over the Internet.

2. The method of claim 1, wherein the store payment page comprises:
    a first interface configured to receive a payment means including the virtual code; and
    a second interface configured to receive the order information.

3. The method of claim 2, wherein, when the user client generates the virtual code by using the virtual code generation function stored in the user client, the user client generates the virtual code at a first time, outputs the generated virtual code on a screen of the user client, and copies the generated virtual code into the first interface of the store payment page.

4. The method of claim 1, further comprising:
    receiving, by the store client, a payment approval result from the payment service server;
    transmitting, by the store client, the payment approval result to the user client; and
    transmitting, by the store client, guidance information to the user client.

5. The method of claim 4, wherein the inputting of the virtual code and the order information comprises:
    inputting identification data of the user client, along with the virtual code and the order information,
    wherein the transmitting of the payment approval result and the transmitting of the guidance information comprises:
    identifying the user client corresponding to the order information; and
    transmitting the payment approval result and the guidance information to the user client, based on identification data of a plurality of mobile terminals connected to the store's intranet.

6. The method of claim 4, wherein the inputting of the virtual code and the order information comprises:
    receiving contact information corresponding to the user client, along with the virtual code and the order information, and
    wherein the transmitting of the guidance information comprises:
    transmitting, in response to a detection that the user client is not connected to the intranet, the guidance information to the received contact information matched with the virtual code or the order information.

7. The method of claim 1, wherein the providing the store payment page comprises:
    scanning of a plurality of intranets by the user client;
    receiving, from the user client, a selection of one intranet among the plurality of intranet; and
    providing the store payment page by the store client corresponding to the selected intranet.

8. The method of claim 1, wherein the generating the virtual code comprises:
    matching the virtual code in each unit account to the card number that is assigned to the card by the card issuer; and
    including financial institution server search information or virtual token verification server search information in the virtual code, wherein the financial institution server search information is capable of searching the financial institution server corresponding to the card number, and the virtual token verification server search information is capable of searching the virtual token verification server corresponding to the card number.

* * * * *